Aug. 1, 1939.   R. BISCHOFF   2,168,255
VALVE
Original Filed Dec. 18, 1935   10 Sheets-Sheet 1

Inventor
ROBERT BISCHOFF
By Malcolm F. Gannett
Attorney

Aug. 1, 1939. R. BISCHOFF 2,168,255
VALVE
Original Filed Dec. 18, 1935 10 Sheets-Sheet 2

Inventor
ROBERT BISCHOFF
By Malcolm F. Gannett
Attorney

Aug. 1, 1939.   R. BISCHOFF   2,168,255
VALVE
Original Filed Dec. 18, 1935   10 Sheets-Sheet 5

Inventor
ROBERT BISCHOFF
By Malcolm F. Gannett
Attorney

Aug. 1, 1939.  R. BISCHOFF  2,168,255
VALVE
Original Filed Dec. 18, 1935  10 Sheets-Sheet 6

Fig. 7

Inventor
ROBERT BISCHOFF
By Malcolm F. Gannett
Attorney

Aug. 1, 1939.　　　R. BISCHOFF　　　2,168,255
VALVE
Original Filed Dec. 18, 1935　10 Sheets-Sheet 8

Inventor
ROBERT BISCHOFF
By Malcolm F. Gannett
Attorney

Aug. 1, 1939.　　　　R. BISCHOFF　　　　2,168,255
VALVE
Original Filed Dec. 18, 1935　　10 Sheets-Sheet 9

Inventor
ROBERT BISCHOFF
By Malcolm F. Gannett
Attorney

Aug. 1, 1939.  R. BISCHOFF  2,168,255
VALVE
Original Filed Dec. 18, 1935   10 Sheets-Sheet 10

Inventor
ROBERT BISCHOFF
By Malcolm F. Gannett
Attorney

Patented Aug. 1, 1939

2,168,255

UNITED STATES PATENT OFFICE 2,168,255

VALVE

Robert Bischoff, Baltimore, Md., assignor to S. Morgan Smith Company, York, Pa., a corporation of Pennsylvania Original application December 18, 1935, Serial No. 54,998. Divided and this application March 10, 1939, Serial No. 260,906

5 Claims. (Cl. 137—139)

This invention relates to valves of the type adapted to be automatically operated to control the flow of fluid in a conduit, and is a division of my prior application for Letters Patent for Valve, filed in the United States Patent Office December 18, 1935, Serial No. 54,998.

An improved fluid pressure operated cone type of plug valve is shown in United States Patent No. 2,078,231, granted April 27, 1937, on an application filed by Eugene C. Brisbane, and the present invention relates to an improved type of control valve device for the Brisbane type of valve.

An object of the invention is to provide an improved control valve device for fluid operated valve mechanisms having a rotary piston for actuating the valve plug operating mechanism.

Another object of the invention is to provide an improved means for controlling the operation of the control valve device in accordance with flow conditions in the conduit in which the main valve is installed.

Another object of the invention is to provide an improved control valve device of the above type in which means are included for successively controling the fluid pressure employed for operating the control valve.

Another object of the invention is to provide an improved control valve device of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

Only so much of the construction and operation of the main valve is herein shown and described as is deemed necessary for a clear understanding of the operation of the control valve device for the operating mechanism of the main valve, since the main valve has been fully shown and described in the above mentioned Brisbane United States Patent No. 2,078,231.

Figure 1:
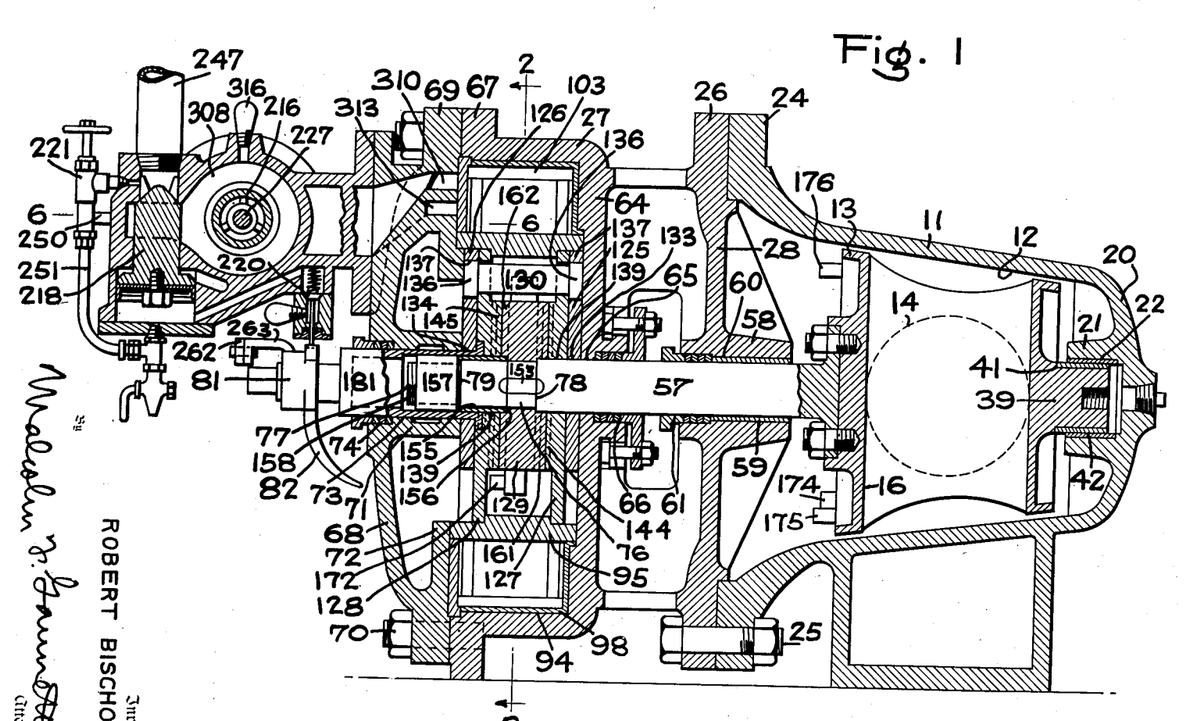
Figure 1 is a vertical longitudinal section taken through the main valve body showing the plug in closed position.
Figures 14, 15:
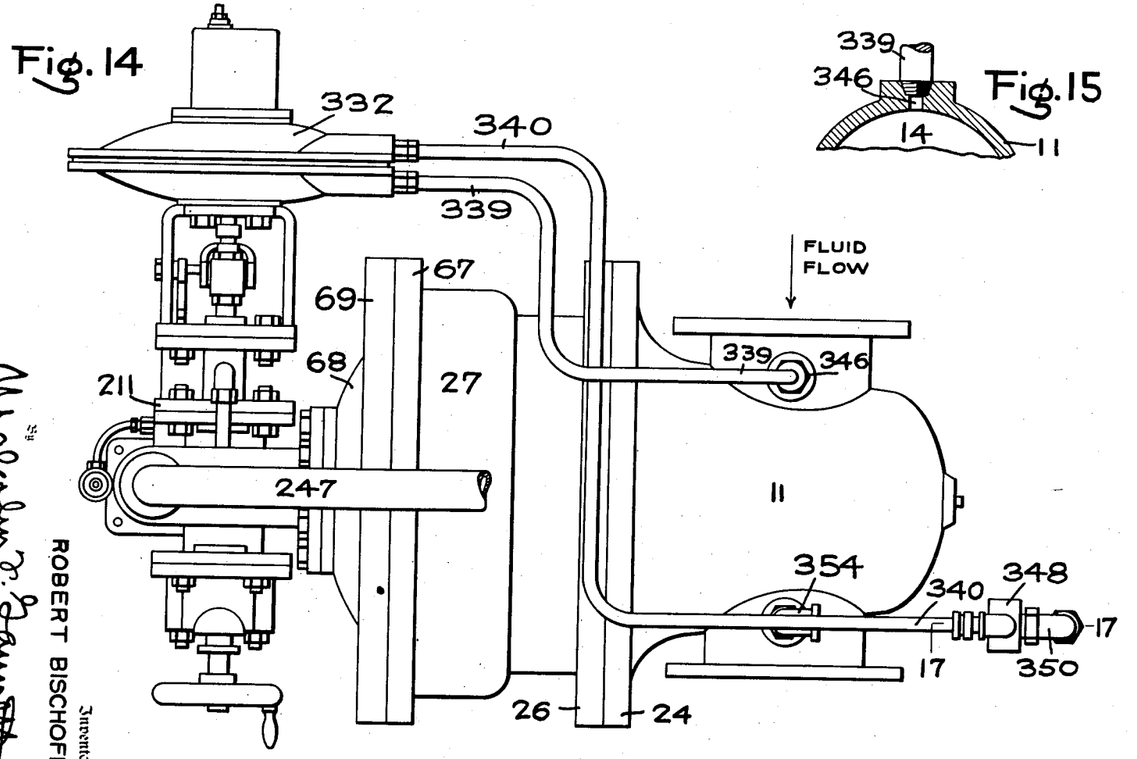
Fig. 14 is a plan of a valve having a diaphragm operated control valve mechanism, showing one way of connecting the chambers of the diaphragm to a source of fluid under pressure.
Fig. 15 is a detail section showing the piezometer connection of one of the diaphragm pipes on the valve body.
Figure 16:
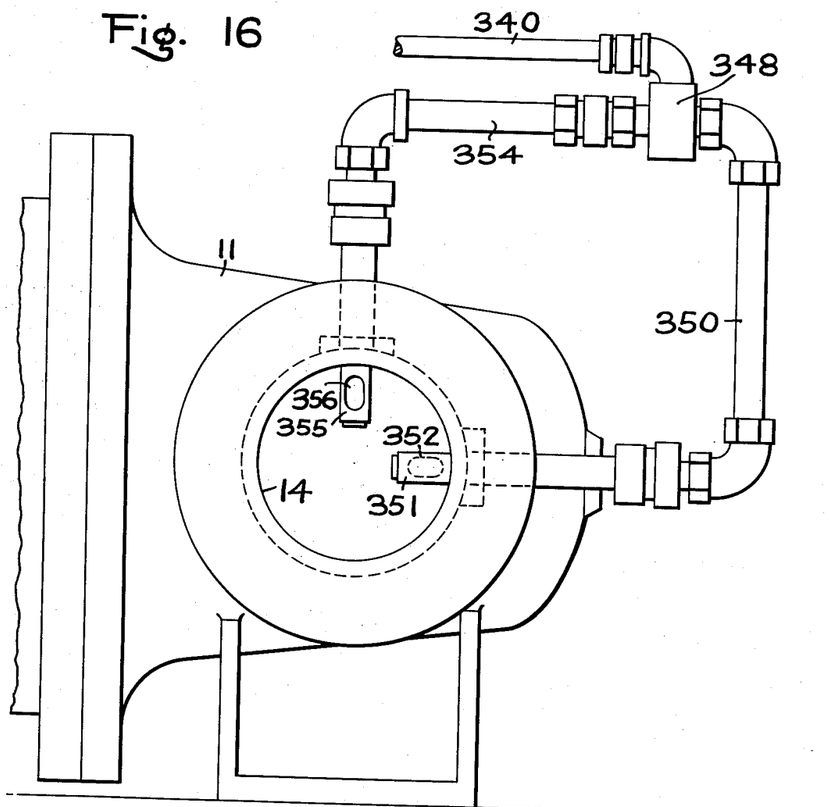
Fig. 16 is an enlarged elevation of a portion of the structure shown in Fig. 14, showing the flow tubes and associated parts.

Referring to the drawings, and especially to Figs. 1, 14 and 16, the improved valve comprises a main body or casing 11, having a cavity 12 formed therein for a tapered plug 13, the cavity being intersected by a longitudinal waterway or opening 14 which constitutes a passage through the valve in the usual manner.

The plug 13 also has a passage 16 formed therein.

The passages 14 and 16 are round and both are of substantially the same diameter so that when the plug 13 is in open position (not shown), a uniform bore will extend through the valve from end to end.

The valve body 11 is preferably constructed from a single casting having a tapered side wall, and the small end of the body is rounded, as indicated at 20.

A boss 21 is formed centrally in the small end of the casing 11, said boss having an opening 22 formed therein for a purpose to be hereinafter more fully described.

The larger end of the valve body 11 is formed with an outwardly projecting flange 24 which has secured thereto by any suitable means, such as bolts 25, one of which is shown in Fig. 1, a correspondingly formed flange 26 of the housing 27 of the operating mechanism of the valve.

The housing 27, adjacent to the flange 26, is formed with a web 28 which constitutes a cover plate for closing the larger end of the cavity 12 of the valve body 11.

The tapered plug 13 is supported for both axial and rotational movement in the valve body. At its lower or smaller end the plug 13 is formed with an extension which constitutes a trunnion 39. The trunnion 39 carries a bushing 41 which is mounted in a bushing 42 disposed in opening 22 heretofore referred to.

Projecting from the top of the plug 13 and detachably secured to said plug by bolts or the like 56, is the main shaft or stem 57 of the valve.

The web 28 of housing 27 is formed with a boss 58 having an opening 59 therein in which is mounted a bushing 60. The valve stem 57 passes through the opening 59 and the bushing 60 constitutes the main bearing for the valve stem.

A packing gland 61 disposed on the outer side of the web 28 prevents leakage of fluid around the valve stem.

At a suitable distance beyond the web 28, the housing 27 is formed with a second web 64 having an opening 65 formed centrally therein through which the valve stem 57 extends. Leakage of fluid around the valve stem 57 at this point is prevented by packing gland 66.

The outer end of the housing 27 is formed with an outwardly projecting flange 67.

A cover 68, having a flange 69 engaging the flange 67 of the housing 27, is detachably secured to said housing by a plurality of bolts 70. The cover 68 is dome shaped, as shown in Figs. 1, 3, 5, 6 and 14.

Formed integrally with the cover 68, is a central inwardly projecting boss 71. A web 72 projects inwardly from the flanged portion of the cover and forms between it and the web 64, a chamber in which is disposed the operating mechanism of the valve. The boss 71 is formed with an opening 73, and an opening 74 is formed centrally in the dome shaped wall of the cover 68.

The valve stem 57 is formed with various diameters. In Fig. 1 the main portion of the valve stem is designated by the reference character 57, the intermediate section of the valve stem being indicated at 76, and the third or outer portion of the stem being indicated by the reference numeral 77. Between the portions 57 and 76 of the valve stem, there is a shoulder 78, and between the portions 76 and 77, there is a shoulder 79.

As shown in Fig. 1, the main valve stem 57 terminates within the boss 71, and the extremity of said valve stem is threaded for a purpose to be hereinafter described.

The valve operating means preferably comprises a fluid operated rotary piston 95 and mechanism operated by said piston. The piston 95 is rotatably mounted in a suitable cylinder 94 formed in the housing 27.

Figure 2:
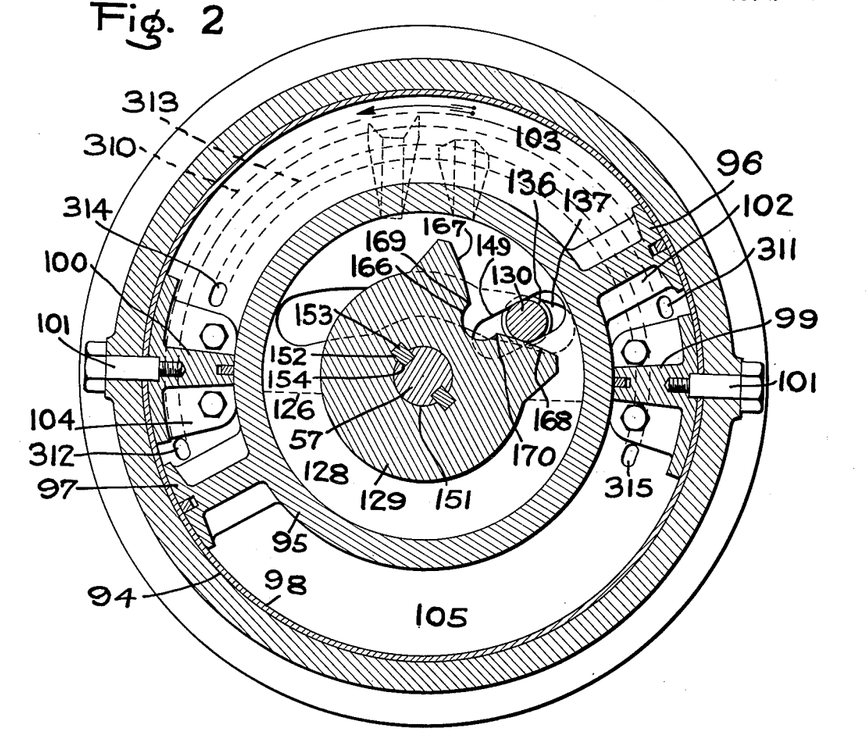
Fig. 2 is a transverse section taken on the line 2—2 of Fig. 1, looking in the direction of the arrow, showing the rotary piston and parts associated therewith.
Figure 3:
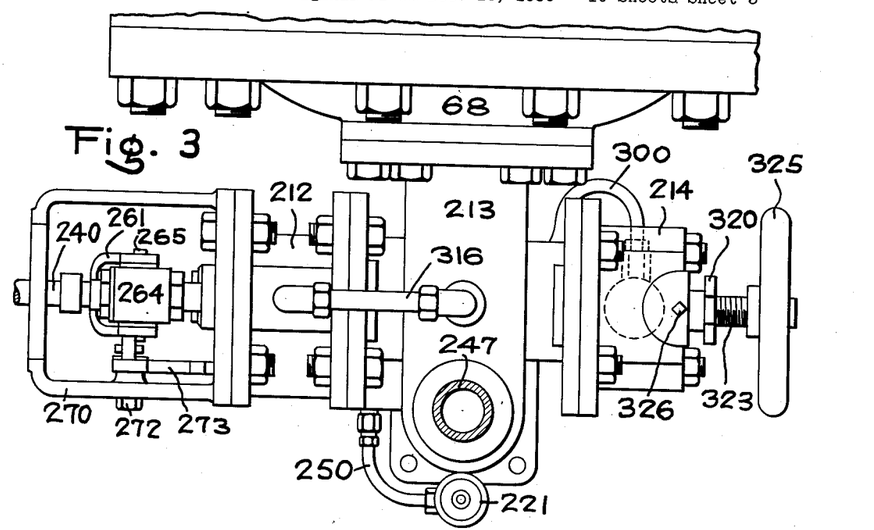
Fig. 3 is a plan of the control valve device associated with the main valve, the actuating means for the control valve being omitted.

As shown in Figs. 1 and 2, the piston 95 comprises a main body portion, annular in form, and a pair of diametrically disposed arms or blades 96 and 97, which project outwardly from the annular body portion of the piston. The arms 96, 97 constitute movable abutments, the purpose of which will be hereinafter fully described.

The valve stem 57 extends through the central portion of the piston 95, and carried by the valve stem and also by the piston, are parts of the operating mechanism, as will be hereinafter more fully described.

As shown in Fig. 2, the diameter of the main body portion of the piston 95 is less than the diameter of the cylinder 94, and the walls of the cylinder which enclose the piston are lined with thin sheets of suitable wear resisting material, as indicated at 98.

Disposed in the space between the side wall of the cylinder 94 and the main annular body portion of piston 95, and arranged diametrically to each other, are spacer blocks or arms 99 and 100. These members are carried by the wall of the cylinder 94, being secured thereto by bolts or the like 101. The spacer blocks or arms 99 and 100 constitute fixed abutments which, together with the arms or wings 96 and 97 of the piston 95, form chambers 102, 103, 104 and 105.

In order to rotate the piston 95, fluid under pressure from any suitable source of supply may be used.

The valve in actual practice, when installed in a water pipe line, has been actuated by water under pressure obtained either from the pipe line to which the valve is connected, or to a separate source of supply.

Any suitable means may be employed for supplying fluid under pressure to the valve for the purpose of operating piston 95, and any suitable means may be employed for controlling the supply of fluid under pressure to the piston chambers of the valve. In the present instance a suitable control valve device is adapted to control the supply of fluid under pressure to the piston chambers, as will be hereinafter more fully described.

As shown in Figs. 1 and 2, the valve operating mechanism comprises a pair of fixed plates 125 and 126, a pair of movable plates 127, 128, a single plate 129, and a pin 130, operatively associated with all of said plates, in the manner to be hereinafter more fully described.

Plates 125 and 126 are similar in form and construction. If so desired these plates may be circular in outline. Plate 125 is secured to the web 64 of the housing 27, and plate 126 is secured to the web 72 of cover 68. The plates 125 and 126 are respectively formed with substantially central openings 133 and 134, through which the valve stem 57 extends.

The pin 130 is composed of a main cylindrical body portion, on the opposite ends of which, rollers 136 are rotatably mounted, said rollers being slightly larger in diameter than the main body of the pin, as shown in Figs. 1 and 2.

The plates 125 and 126 have correspondingly formed openings 137 therein, in which the rollers 136 of the pin 130 are disposed. The openings 137 provide means for guiding the pin 130, and the contour of said openings is shaped in a manner to be hereinafter described, so that the pin 130 will be caused to travel in a predetermined path during the operation of the mechanism.

The movable plates 127 and 128 each comprise a circular disc having an opening 139 formed centrally therein, through which the valve stem extends. These plates are connected to the piston 95.

Plate 127 has a surface which lies flush against the adjacent face of the fixed plate 125, and plate 128 has a surface which lies flush against the adjacent face of fixed plate 126. The opposite surface of plate 127 is formed with a series of upwardly projecting serrations or teeth 144, and plate 128 is also formed with a series of similar serrations or teeth 145. The plates 127 and 128 are so mounted that the serrations 144 and 145 project towards each other.

As shown in Fig. 2, an elongated opening or slot 149 is formed in each plate 127 and 128. The openings 149 are radially disposed and have a width corresponding substantially to the thickness of the main body portion of the pin 130 and a suitable length to permit movement of the pin 130 in said slots from a point near the center of the plates 127 and 128, to a point near the outer edges or peripheries of said plates.

The plate 129 comprises an annular body portion having a center opening 151 formed therein so that said plate can be mounted on the portion 76 of the valve stem 57. In order to key said plate to said valve stem, the plate is formed with grooves or recesses 152, and the valve stem 57 is likewise formed with grooves or recesses 154, and keys 153 are mounted in the grooves or recesses 152 and 154.

For the purpose of preventing rectilinear movement of the plate 129 with respect to the valve stem 57, a sleeve 155 is utilized. The sleeve 155 is fitted on to the reduced portion 76 of the valve stem, one end of said sleeve bearing against a shoulder 156 formed in the plate 129 around opening 151, as shown in Fig. 1. The sleeve 155 is held in position by means of a nut or collar 157 which is mounted on the threads 158 of the section 77 of the valve stem.

The external diameter of sleeve 155 is approximately the same as the diameter of the main portion of the valve stem 57, and said sleeve neatly fits the openings 139 of plate 128.

Encircling sleeve 155 and nut 157, is a sleeve 181 which is disposed in opening 73 heretofore referred to. The inner end of sleeve 181 is formed with a flange which is secured to plate 128, so that rotation of said plate also effects corresponding rotation of the sleeve 181.

The sleeve 181 extends outwardly beyond the cover 68 and has mounted thereon a collar 81 carrying an indicator arm 82 for indicating the position of the valve plug 13.

The interior of the sleeve 181 is made of a size to snugly engage nut 157, and this construction constitutes the third bearing for the valve stem.

When the parts are assembled, nut or collar 157 is screwed down tight and this action forces the opposite end of sleeve 155 against the shoulder 156 of plate 129, so that said plate is forced tightly against shoulder 78 between portion 76 and the main portion of the valve stem 57.

In this way plate 129 is clamped tightly between the valve stem shoulder 78 and the inner end of the sleeve 155, and consequently rectilinear movement of plate 129 in either direction will effect a corresponding movement of the valve stem 57, for a purpose to be hereinafter described.

Plate 129 is somewhat thicker than plates 125, 126, 127 and 128 heretofore described, and both sides of plate 129 have serrations thereon. The serrations 161 on one side of plate 129 engage the serrations 144 of plate 127, and the serrations 162 on the opposite side of said plate 129 engage the serrations 145 of plate 128.

As shown in Fig. 2, a semi-circular notch 166 is formed in plate 129, said notch having a diameter corresponding substantially to the diameter of pin 130, so that said pin can be positioned in said notch during the operation of the device, in the manner to be hereinafter more fully described.

Extending outwardly in opposite directions from notch 166, are arcuate peripheral surfaces 167, 168. A pronounced corner or shoulder 169 is formed where the surface 167 meets the notch 166, and a similar corner or shoulder 170 is formed at the inner end of the surface 168. The purpose of the corners or shoulders 169 and 170 will be hereinafter more fully described.

When plate 129 is assembled on the valve stem 57 and connected thereto by key 153, and these parts are assembled in the valve with the valve plug 13 in closed position, notch 166 will be located in the position shown in Fig. 2, and pin 130 engages surface 168 and thus prevents rotary movement of plate 129. Plates 127 and 128 are also positioned relatively to the plate 129, so that when the valve plug 13 is in closed position, the serrations 161 and 162 of plate 129 will be partly intermeshed, respectively, with the serrations 144 of plate 127 and serrations 145 of plate 128. With plate 129 thus disposed relatively to plates 127 and 128, when rotary movement is imparted to plates 127 and 128, said plates will be moved with respect to plate 129, which during such rotary movement of plates 127 and 128 does not rotate, so that the relative position of plate 129 with respect to plates 127 and 128 is shifted from the intermediate or partly intermeshed position to the position in which serrations 161 of plate 129 are out of mesh with the serrations 144 of plate 127, and the serrations 162 of plate 129 are fully meshed with the serrations 145 of plate 128. In this way plate 129 is moved farther away from plate 127 and nearer to plate 128, for a purpose which will be hereinafter more fully described.

As shown in Fig. 1, in order to limit the above described outward movement of plate 129 with respect to plate 127, a stop 172 is provided, said stop in the present instance comprising a projection mounted on plate 129 adjacent the outer peripheral edge thereof and so positioned as to engage the surface of plate 128 when plate 129 moves outwardly in the above described manner, and prevent further outward movement of said plate.

Means are also provided for limiting the rotary movement of the valve plug 13, and for this purpose the valve plug is formed with a lug 174 which projects upwardly from the outer edge of the large end of the plug.

According to the construction herein shown and described, the valve illustrated is a two-way type of valve, and the plug 13 is adapted to rotate through 90° from closed to open position, and vice versa.

Accordingly the inner surface of the wall of the valve casing 11 is formed with two projections or lugs 175 and 176 which are suitably spaced apart. When the plug 13 is in closed position, stop lug 174 thereof abuts the lug 175, and when the valve plug is in open position, lug 174 will engage lug 176. In this way, when the plug 13 is moved from closed to open position, bore 16 therein wi'l be correctly registered with the waterway 14, so that a smooth passage will extend through the valve.

Since the serrations 144 on plate 127, serrations 145 on plate 128, and serrations 161 and 162 on plate 129, constitute cam surfaces, plate 129 functions as a lifter cam which is keyed to valve stem 57, and plates 127, 128 function as rotating cams which are keyed to the rotor or piston 95. Also, fixed plates 125, 126 constitute means for guiding pin 130 so that said pin will interlock the three cams 127, 128 and 129 after the plug 13 has been unseated, and disengage said three cams at each end of 90° of rotation of the plug, al'owing the plug 13 freedom of axial movement to either unseat or seat in both open and closed positions.

It has been described that plates 125 and 126 are formed with openings 137, which constitute guides for pin 130, said openings being adapted to receive the rollers 136 on said pin.

In order to guide the pin during operation of the device, the openings 137 are formed with a specific contour (see Fig. 2) which enable the pin to be guided in a predetermined path, and since the outer edges of the rollers 136 engage the edges of the walls of said openings, these edges constitute cam surfaces.

During the operation of the valve plug actuating means the pin 130 travels from a point near the end at the right of the openings, as viewed in Fig. 2, to a point near the end at the left of said openings, and in so traveling through the openings 137, the pin 130 is directed into the notch 166 of cam plate 129, where said pin remains while the plug is being rotated. When the pin is disposed in notch 166, cam plate 129 will be interlocked with plates 127, 128, so that plate 129 will rotate with plates 127, 128. At the completion of the rotation of the valve plug 13 from closed to open position, pin 130 will move out of the notch 166 and engage surface 168 of plate 129 again retaining said plate in position and preventing rotation thereof.

For the purpose of controlling the supply of fluid under pressure employed for operating the rotary piston 95, a suitable control valve device 211 is employed.

In the present instance, the control valve device 211 is shown mounted on the cover plate 68.

Figures 6, 13:
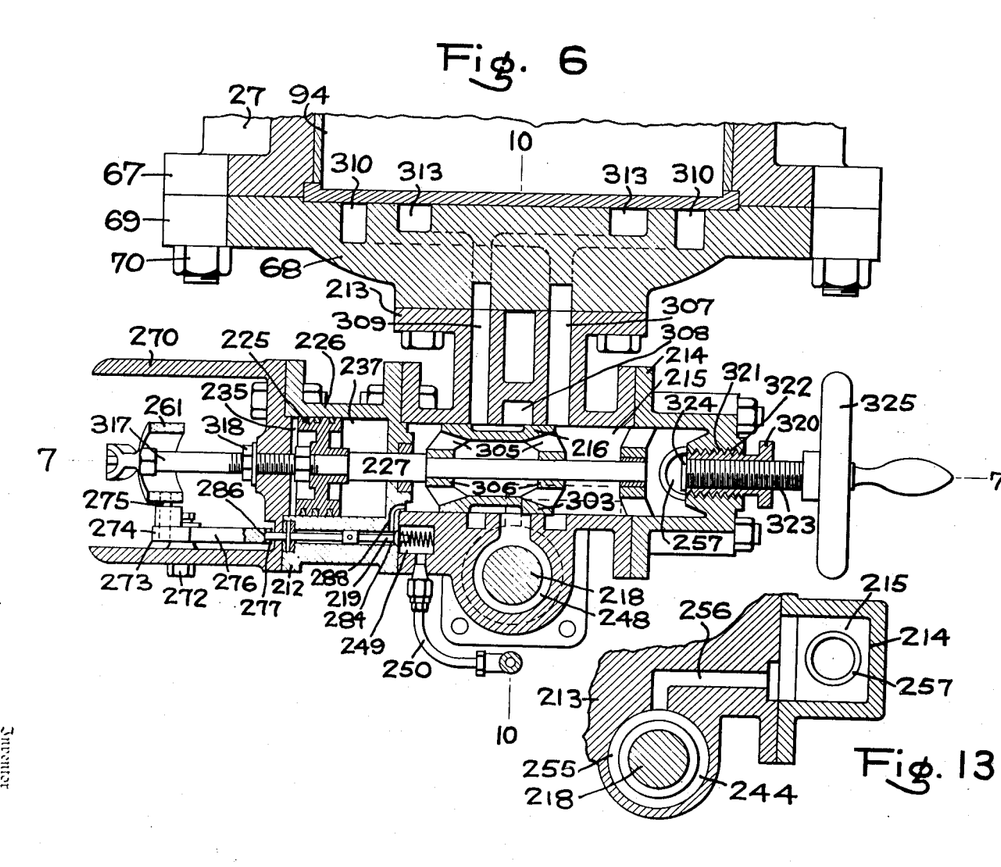
Fig. 6 is a horizontal section through the control valve device taken on the line 6—6 of Fig. 1.
Fig. 13 is a horizontal section taken on the line 13—13 of Fig. 10.
Figure 7:
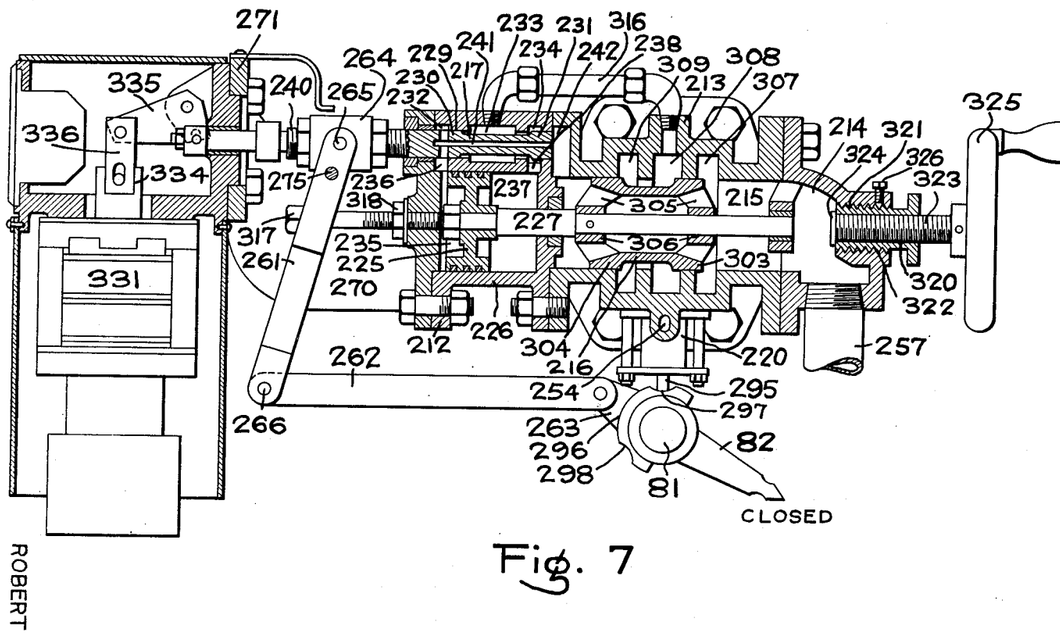
Fig. 7 is a vertical longitudinal section of the control valve device taken on the line 7—7 of Fig. 6, showing the same provided with a solenoid operating mechanism, the control valve being shown in closed position.

As shown in Figs. 6 and 7, the control valve device has a casing formed of three sections 212, 213 and 214, said sections being suitably bolted together. The intermediate section 213 constitutes the main body of the control valve device and has formed therein a chamber 215 for a sleeve type four-way valve 216.

Figure 11:
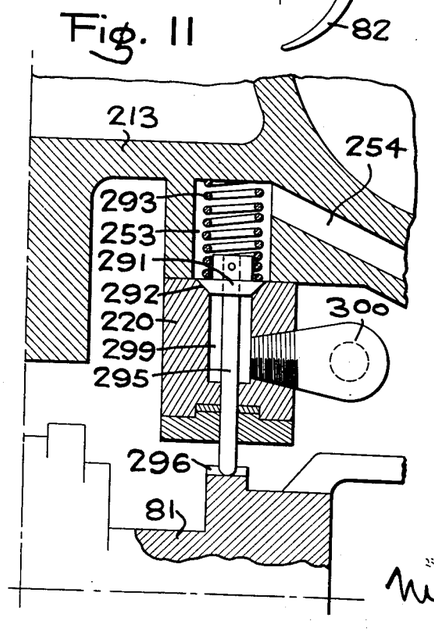
Fig. 11 is an enlarged section of the secondary pilot valve device for the power supply shut off valve shown in Fig. 10.
Figure 12:
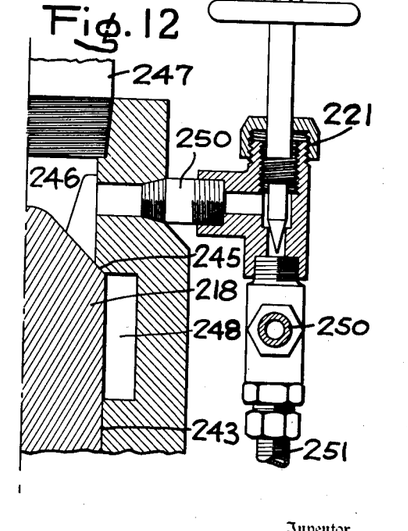
Fig. 12 is an enlarged vertical section of the throttling valve device taken on the line 12—12 of Fig. 4.

The operation of the valve 216 is controlled by a plurality of valve devices including a pilot valve 217 (Figs. 7 and 8), a power supply shut off valve 218 (Fig. 10), a primary pilot valve device 219 for the power supply shut off valve 218 (Figs. 6 and 9), a secondary pilot valve device 220 for the power supply shut off valve 218 (Fig. 11), and a throttling valve device 221 (Fig. 12). All of the above mentioned elements and devices are constructed and operated in the manner to be hereinafter referred to.

Figure 8:
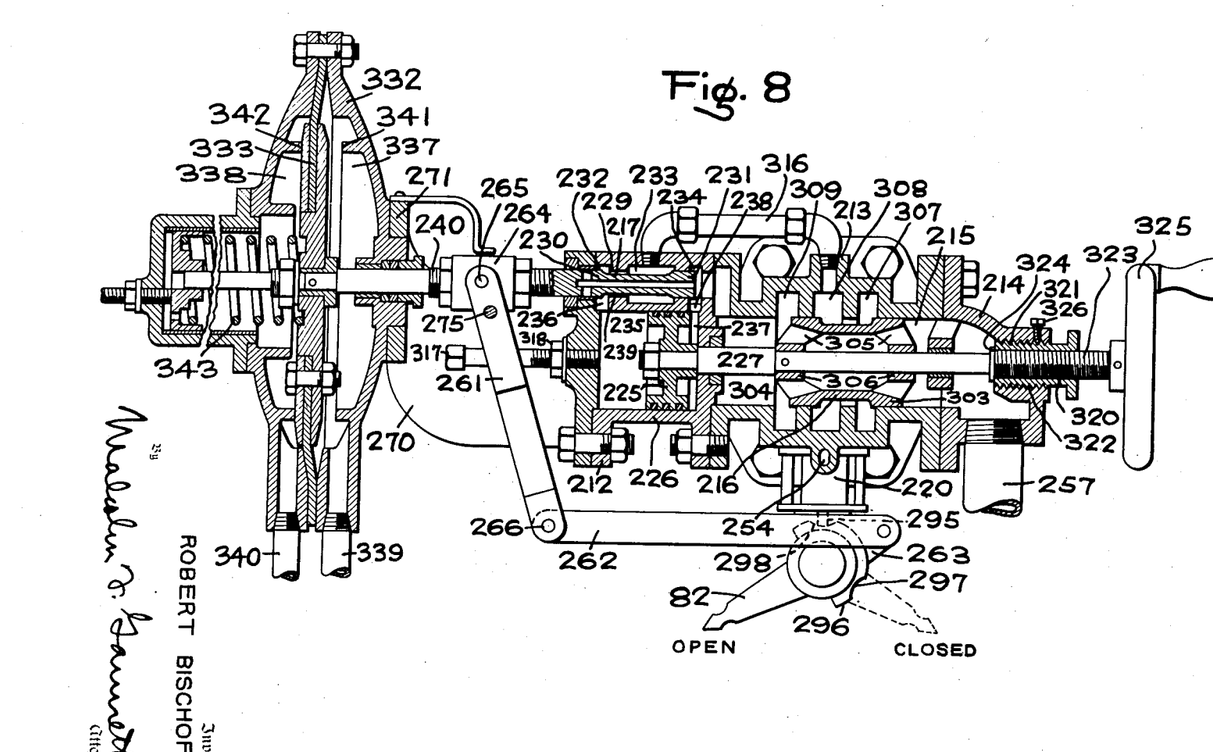
Fig. 8 is a view similar to Fig. 7, the control valve being shown in the position in which the valve plug is open, the operating mechanism for the control valve also being shown as the diaphragm device illustrated also in Fig. 5.

Referring to Figs. 6, 7 and 8, for the purpose of operating the sleeve type four-way valve 216, in the present instance there is employed a piston 225. The piston 225 is mounted in a cylinder 226, and connected to the valve 216 by a rod 227.

The purpose of the pilot valve 217 is to control the supply of fluid under pressure employed for operating piston 225. Accordingly, the pilot valve 217 is mounted in a bore 229 formed in the section 212 of the casing of the control valve, as shown in Figs. 7 and 8.

Pilot valve 217 is formed with spaced apart heads 230, 231, said heads being connected by a reduced shank portion.

The bore 229 is formed with three spaced apart chambers 232, 233 and 234. Chamber 232 is connected to chamber 235 on one side of piston 225 by a port 236, and chamber 234 is connected to chamber 237 on the opposite side of piston 225 by a port 238. When the control valve device 211 is in closed position, head 231 laps port 238, thereby cutting off communication between chambers 234 and 237, and head 230 of the pilot valve 217 closes passage 239 between chambers 233 and 232.

The pilot valve 217 has a stem 230 which projects outwardly from the casing of the control valve device and is connected to an actuator to be hereinafter referred to.

Figure 10:
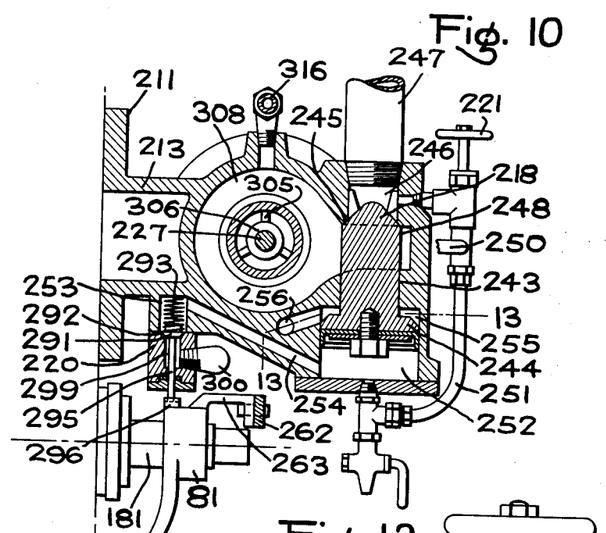
Fig. 10 is a vertical transverse section of the control valve device taken along the line 10—10 of Fig. 6.

Referring to Figs. 1 and 10, the power shut off valve 218 comprises a main body portion mounted in a bore 243 formed in the section 213 of the control valve casing. The lower portion of the bore 243 is enlarged to provide a chamber for a piston 244 for operating valve 218.

The upper end of valve 218 is formed with a conical surface adapted to normally seat against a seat 245 formed at the lower edge of a chamber 246.

Connected to chamber 246 is one end of a pipe 247 which leads from a suitable source of fluid under pressure. The fluid supplied through pipe 247 is the fluid which is employed for operating the piston 95 of the valve 11, and the purpose of valve 218 is to control the entrance of such fluid under pressure into the control valve device 211, in a manner to be hereinafter described.

Beneath the valve seat 245, there is a passage 248 which connects chamber 246 with a port 208 when the valve 218 is open.

As shown in Figs. 6 and 10, chamber 246 is connected to chamber 249 of valve device 219 by a pipe 250.

The amount of fluid permitted to flow through pipe 250 is controlled by throttling valve device 221.

Leading from the pipe 250 is another pipe 251 which connects chamber 246 with chamber 252 on the lower side of piston 244, as shown in Fig. 10. Chamber 252 is connected to chamber 253 of the secondary pilot valve device 220, by a passage 254.

Chamber 255 on the upper side of piston 244 is connected to chamber 215 by passage 256, as shown in Figs. 10 and 13.

Chamber 215 is at all times connected to a sewer or the like, by a pipe 257, so that any fluid within said chamber drains away from the control valve device.

Figure 4:
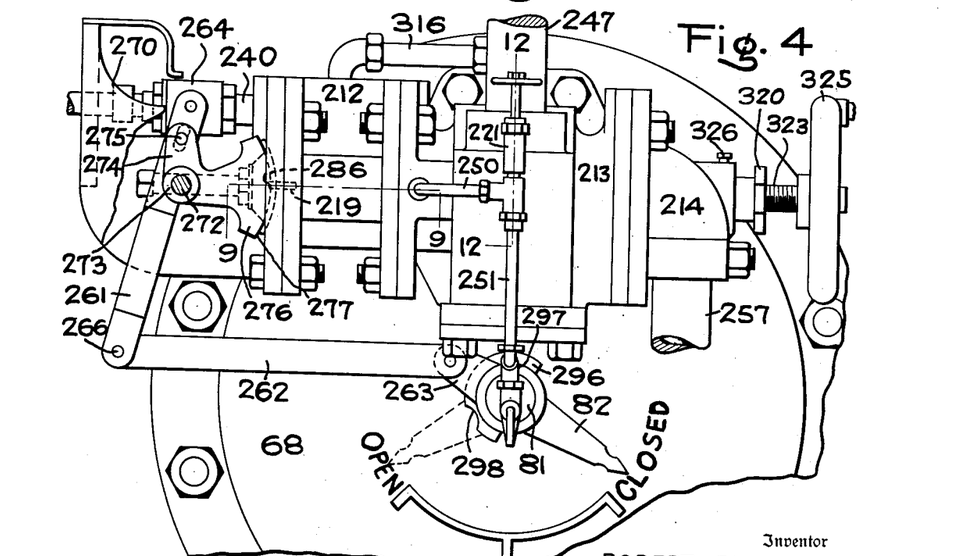
Fig. 4 is a front elevation of the structure shown in Fig. 3.

As shown in Figs. 4, 6 and 7, the stem 240 of the pilot valve 217 is connected to the extension 181 of the main valve stem by means of lever 261, link 262, and crank arm 263. The crank arm 263 is formed on the collar 81 heretofore referred to.

Adjustably mounted on the stem 240 of valve 217, is a block 264. Pivotally connected to said block by means of pins 265 (Fig. 3) is the upper forked end of the lever 261. The lower end of lever 261 is pivotally connected to the link 262 by means of a pin 266.

Secured to the section 212 of the control valve casing, is a bracket 270. This bracket is open at the top and bottom, and has side walls and an outer end wall 271.

Pivotally mounted to one of the side walls of the bracket 270, by means of bolt 272, is a bell crank lever 273.

One arm 274 of the bell crank lever 273 is connected to lever 261 by a pin 275. The other arm 276 of the bell crank lever 273 extends inwardly towards the end of the casing of the control valve and has formed thereon a cam surface 277, the purpose of which will be hereinafter more fully described.

Figure 9:
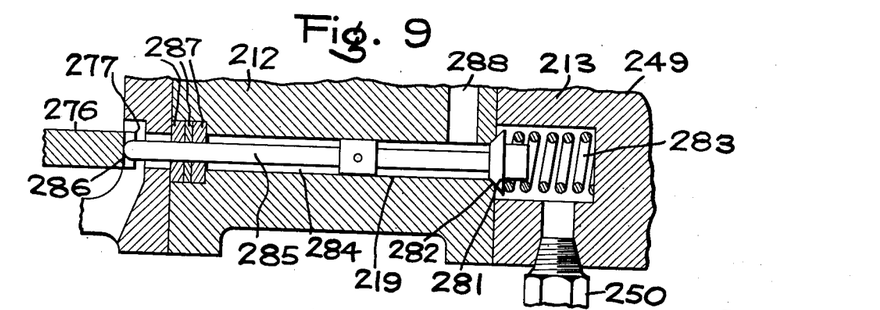
Fig. 9 is a detail horizontal section taken on the line 9—9 of Fig. 4, showing the primary pilot valve device for the power supply shut off valve mechanism of the control valve.

Referring now to Figs. 6 and 9, the primary pilot valve device 219 for the power supply shut off valve 218, comprises a poppet valve 281 adapted to normally seat against a seat 282 formed in the casing at one end of chamber 249, the valve 281 being retained against the seat 282 by means of an expansible coil spring 283.

Fastened to the valve 281 and extending through a bore 284, is a stem 285. The extremity of stem 285 projects beyond the valve casing and engages cam surface 277 of bell crank lever 273.

Cam surface 277 is formed, as shown in Figs. 4 and 9, with a depressed portion 286, in which the extremity of the valve stem 285 is disposed when the valve 281 is seated. Movement of bell crank lever 273 in either direction from the position shown in Fig. 4, causes the extremity of the valve stem 285 to slide out of the depressed or notched portion 286 onto the cam surface 277, and this action moves the valve 281 away from seat 282, compressing spring 283.

In order to prevent leakage of fluid from valve chamber 249 through the bore 284, suitable packing material 287 is employed, as shown in Fig. 9.

As shown in Fig. 6, bore 284 is connected to chamber 215, by a passage 283, so that when the valve 281 is unseated, fluid will flow from chamber 249 to chamber 215, and from thence to the sewer.

Referring now to Fig. 11, the secondary pilot valve 220 for the power supply shut off valve 218 comprises a poppet valve 291 adapted to normally seat against a seat 292 formed at one end of chamber 253, the valve 291 being retained against seat 292 by means of an expansible coil spring 293.

Fastened to valve 291 and extending through a bore 294, is a stem 295. The extremity of stem 295 projects beyond the valve casing and engages cam surface 296 on collar 81.

As shown in Figs. 4, 7, 8 and 11, cam surface 296 is formed with a pair of spaced depressions 297, 298.

When the main valve plug 13 is in closed position, the end of valve stem 295 is disposed in depression 297, and when the main valve plug 13 is in open position, the end of valve stem 295 is disposed in depression 298. When plug 13 is turned from closed to open position or vice versa, the end of stem 295 rides out of either depression onto the cam surface 296 and this action effects movement of valve 291 away from seat 292, so that communication is established from chamber 253 to chamber 299.

Figure 5:
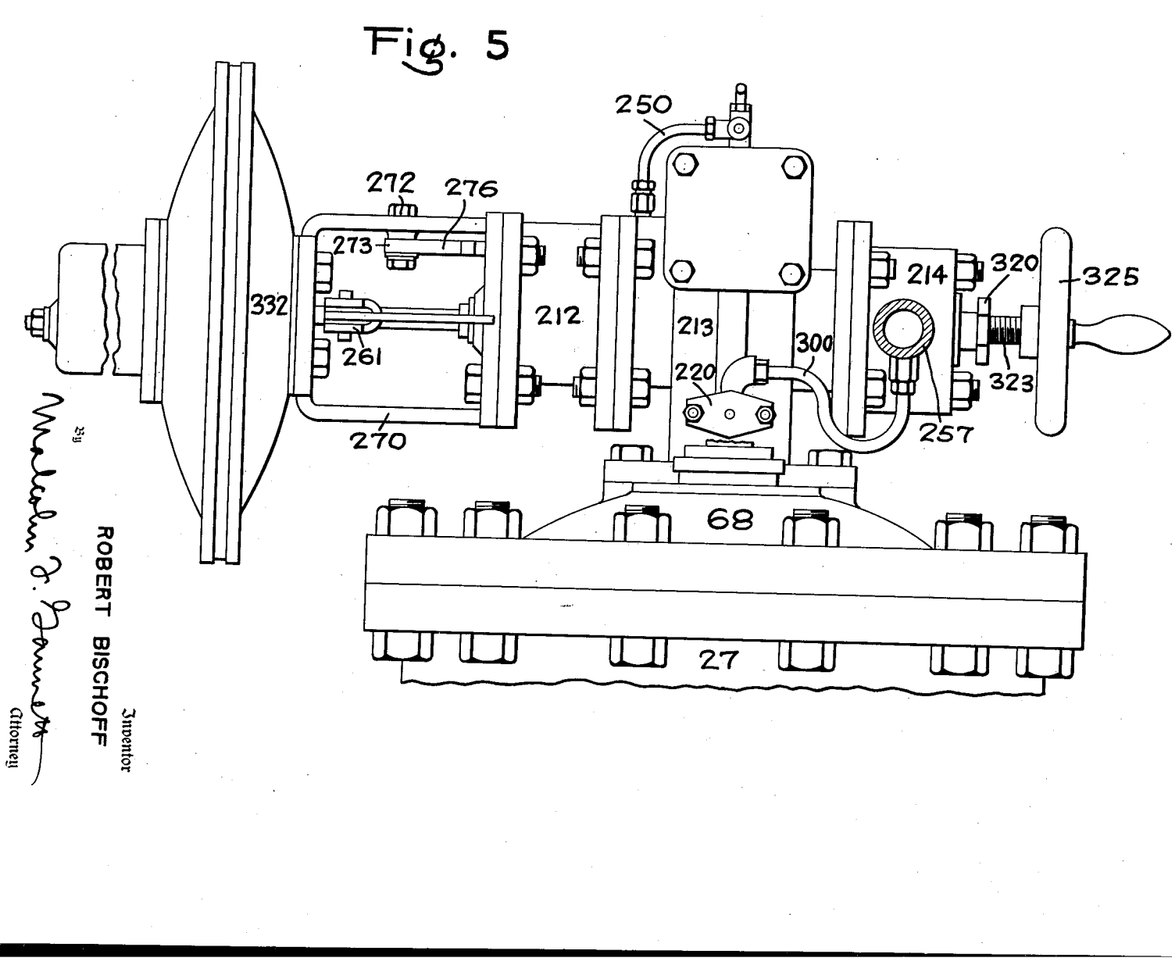
Fig. 5 is a bottom plan of the control valve device, showing the same provided with fluid pressure operated means in the form of a diaphragm device.

Chamber 299 is connected to the sewer pipe 251 by means of pipe 300 so that the fluid in said chamber can drain away from the valve device (see Fig. 5).

Referring to Figs. 6, 7 and 8, the main body of valve 216 is cylindrical in form, having spaced apart heads 303 and 304 at opposite ends of the cylindrical body. The body of the valve 216 is hollow and open at each end, thereby permitting the flow of fluid through the valve chamber 215 from end to end thereof.

As shown in Fig. 10, the cylindrical portion of the valve 216 is connected to the stem or rod 227, by a plurality of arms 305, the inner ends of said arms being formed with collars 306 which encircle the valve stem and are fixed thereto by means of a pin, as shown in Figs. 7 and 8.

A plurality of ports 307, 308 and 309 are formed in the valve casing. Port 308 functions as a pressure port, being connected to the pressure supply pipe 247 when the valve 218 is unseated. Ports 307 and 309 are disposed on opposite sides of port 308, port 307 being controlled by head 303 of the valve 216, and port 309 being controlled by head 304 of said valve.

As shown in Figs. 2 and 6, port 307 is connected respectively, to chambers 102 and 104, heretofore referred to, by means of a passage 310 and ports 311 and 312, passage 310 being formed in the cover plate 68.

Port 309 is connected to chambers 103 and 104 of the rotary piston 95, by passage 313 and ports 314 and 315, respectively.

When the control valve device is in closed position, valve 216 is so positioned that ports 309 and 308 are connected, and port 307 is in communication with chamber 215. With the valve 216 in this position, chambers 102 and 104 of the rotary valve piston 95 are connected to the sewer pipe 251 so that there is no fluid under pressure in said chambers and rotary piston chambers 103 and 105 will be connected to the source of fluid under pressure. With fluid under pressure thus supplied to chambers 103 and 105, the rotary piston 95 will be positioned as shown in Fig. 2.

For the purpose of limiting the rectilinear movement of valve 216 in both directions, suitable means are provided, as will be next described.

Threaded into the end wall of piston chamber 235 is a rod 317, the inner end of which is adapted to engage the end of the valve stem 227, as shown in Fig. 7, when piston 225 is in valve closed position. Rod 317 may be locked in its adjusted position by means of a lock nut 318.

For the purpose of limiting the movement of valve 216 when the same slides from closed to open position there is employed a stop device comprising a sleeve 320 having external threads 321 mounted in a suitable threaded bore 322 in the section 214 of the valve casing, the outer end of the sleeve being enlarged to provide a head which may be engaged by a suitable tool, such as a wrench, for turning the sleeve.

The sleeve 320 is formed with internal threads adapted to engage a threaded rod 323. The inner end of the rod 323 is formed with a head or enlargement 324, and the outer end of the rod carries a hand wheel 325.

When the parts of the control valve device are being assembled and with the head 324 of rod 323 bearing against the inner end of the sleeve 320, the sleeve is screwed into the bore 322 to the position in which the head 324 engages the end of valve stem 227 when the valve 216 is in the open position shown in Fig. 8. When the sleeve has been correctly positioned, it may be locked in such position by set screw 326.

Any suitable means may be employed for operating the control valve device automatically. In the present instance, and as shown in Fig. 7, the stem 240 of pilot valve 217 is shown operatively connected to an electrically operated mechanism, which may be in the nature of a solenoid 331. While in Figs. 5 and 8, stem 240 is shown operatively connected to a fluid pressure operated device, such as a diaphragm device 332.

In the case where pilot valve stem 240 is connected to a diaphragm device, the same is directly connected to the diaphragm 333 of such device, as shown in Fig. 8.

On the other hand, when the stem 240 is connected to a solenoid device, it has been of advantage to connect the same to the plunger element 334 of said solenoid by suitable links and levers, such as bell crank lever 335 and link 336, shown in Fig. 7.

It will be understood that the same operation of the pilot valve 217 can be effected by using either a solenoid device 331, or a diaphragm device 332, since both of these devices will function to move the pilot valve 217 when it is desired to operate the control valve device.

As shown in Fig. 8, the diaphragm device 332 may be of any approved construction and chambers 337, 338 on opposite sides of the diaphragm 333 are adapted to be connected to a suitable source of fluid under pressure by means of pipes 339, 340, which lead, respectively, from said chambers. The movement of the diaphragm 333 is limited by stops 341 and 342 formed in the casing of the diaphragm device on opposite sides of said diaphragm, as shown in Fig. 8.

When the control valve device is in open position the diaphragm 333 will be seated against stop 342, due to the excess of fluid under pressure in chamber 337 acting against the pressure of fluid in chamber 338 and also a spring 343 on the side of the diaphragm having seat 342.

In operation, since the entire valve device is automatically operable, when the valve plug 13 is in closed position, the control valve device 211 will first be operated either by the solenoid device 331 or the diaphragm device 332 to effect rotation of the valve plug from the closed position shown in Fig. 1 to open position.

Accordingly, the first mechanism that operates is either the solenoid device 331 or the diaphragm device 332, and, obviously, the operation of either one of these devices will result in the control valve device 211 being operated.

Since the pilot valve 217 is directly connected to the initial operating element (solenoid device 331 or diaphragm device 332) said pilot valve 217 will be actuated first.

As shown in Fig. 7, in closed position, piston chamber 235 is connected to the sewer pipe 257, through port 236, passage 241 in valve 217, passage 242, and chamber 215. Therefore, when the pilot valve 217 is shifted from the position shown in Fig. 7 to the position shown in Fig. 8, fluid under pressure will be supplied to piston chamber 235 from port 308, through pipe and passage 316, chamber 233, passage 239, and port 236.

Simultaneous with the movement of pilot valve 217 from the position shown in Fig. 7 to the position shown in Fig. 8, bell crank lever 273 will also be operated and in its operation, the stem 285 of the primary pilot valve device 219 will be moved to the right (Fig. 9) due to the movement of the depressed portion 286 in the cam surface 277 away from the end of said stem. This action unseats valve 281, thereby venting chamber 249 to the sewer pipe 257, through passage 259 and chamber 215.

When chamber 249 is vented, as has just been described, fluid under pressure in chamber 252 (Fig. 10), will also be relieved, since chamber 252 is connected to chamber 249, through pipes 251 and 250.

With the relieving of pressure in chamber 252 the pressure in chamber 246, acting against the top of valve 218, forces said valve downwardly, permitting fluid under pressure to flow into chamber 308, through passage 248. In this way fluid under pressure is supplied in sufficient volume to piston chamber 235 to force piston 225 towards the right to the position shown in Fig. 8. This action effects a corresponding movement of sleeve valve 216.

When the valve 216 has thus been moved to open position, port 309 will be unlapped, so that piston chambers 103 and 105 will be connected to the sewer pipe 257, respectively, through ports 314, 315, passage 313, port 309, and chamber 215.

At the same time, port 308 will be connected to port 307 by valve 216, so that fluid under pressure will be supplied from the main supply pipe 247 to passage 310, and from thence to piston chambers 102 and 104, through ports 311 and 312, respectively.

Fluid under pressure supplied to piston chambers 102 and 104, acting on the movable abutments provided by piston arms 96 and 97, will rotate the piston 95 in the direction of the arrow, Fig. 2.

During approximately the first 15° movement of piston 95, the valve plug 13 is unseated and this action is effected in the manner to be next described.

It has heretofore been explained that pin 130 engages surface 168 of cam plate 129. When rotation of the piston is initiated, cam plates 127, 128, acting on the shank of pin 130, tend to move said pin along with them. However, since pin 130 is guided by the openings 137 in fixed plates 125, 126, said pin will be caused to move inwardly and downwardly, due to the inclination of the side walls of the pin guide openings 137 in which pin 130 is disposed.

During the initial movement of piston 95, cam plate 129 remains stationary, since there are no means connecting or interlocking said plate with cam plates 127 and 128, but cam plates 127 and 128 rotate and in so doing the lower cam plate 127 slides radially on the lower surface of cam plate 129, thereby imparting a straight line axial movement to cam plate 129, valve stem 57, and plug 13, so as to unseat said plug. This axial movement is the result of the inclined surfaces of the serrations 162 of cam plate 129 moving up the inclined surfaces of the serrations 145 of cam plate 128 and the inclined surfaces of the serrations 161 of cam plate 129 moving up the inclined surfaces of the serrations 144 of cam plate 127.

Since the valve stem 157 is connected to cam plate 129 in the manner heretofore described, movement of the cam plate 129 towards cam plate 128 will cause plate 129 to urge sleeve 155 outwardly with it, and this axial movement of the sleeve is transmitted through nut 157 to valve stem 57, so that said valve stem is also moved axially a corresponding distance, thereby axially moving the plug 13 and unseating the same. Due to the inclination of the side walls of the valve body 11 and plug 13, only a slight axial movement of the plug is required to unseat the plug and permit the same to rotate freely in cavity 12.

During the rotary movement of cam plates 127, 128 relative to cam plate 129 which takes place during the first 15° rotation of piston 95, pin 130 will move down surface 168 of cam plate 129 towards the notch 166, and when the cam plates 127, 128 have been rotated approximately 15°, pin 130 will be disposed in the notch 166 with the side of said pin abutting shoulder 169 of cam plate 129.

When the pin 130 engages shoulder 169 continued or further movement of piston 95 and cam plates 127, 128 carried by said piston, will result in a corresponding movement being imparted to said cam plate 129, and consequently since the valve stem 57 is keyed to plate 129, the plug 13 will also be rotated.

When the pin 130 moves into engagement with shoulder 169, guide openings 137 cause the pin to drop into the bottom of notch 166 and interlock cam plate 129 with cam plates 127 and 128.

When the plug 13 has been rotated in the above described manner, through the interlocking of cam plate 129 with cam plates 127, 128 of the operating mechanism, through an angle of 90°, lug 174 of the plug 13 strikes the stop lug 176, and further rotation of the plug 13 is prevented.

When lug 174 engages stop lug 176, pin 130 has been partly moved out of notch 166, due to the camming action of the pin guide openings 137 of plates 125, 126. This camming action will cause the pin 130 to ride up over shoulder 169 and during continuous rotary movement of piston 95 and cam plates 127, 128, said pin engages the arcuate surface 167 of plate 129, and in so doing permits said cam plate 129 to remain stationary.

When the pin 130 is removed from the notch 166 in the manner just described, the interlock between cam plates 127, 128 and cam plate 129 is broken, and this action takes place when the valve plug 13 has been rotated to its wide open position.

Since piston 95 and cam plates 127, 128 continue to rotate after the valve plug 13 has been turned to its fully open position, cam plates 127, 128 will continue to move relatively to cam plate 129 which is now stationary, and this movement of cam plates 127, 128 relative to the non-rotating cam plate 129 permits the serrations 161, 162 of cam plate 129 to, respectively, move down serrations 144 of cam plate 147 and serrations 145 of cam plate 128, whereby cam plate 129 is shifted towards the right (Fig. 1), and this action causes a corresponding axial movement of the valve stem 57 so that the valve plug 13 is again moved downwardly of the casing and seated.

From the foregoing it will be noted that during the initial rotary movement of piston 95, the valve plug 13 is unseated, that during the intermediate rotary movement of said piston, the valve plug is turned from closed to open position, and that during the final portion of the rotary movement of said piston the valve plug is reseated. This action is effected by first rotating the piston 95 with said piston uncoupled from the valve stem, then automatically coupling the piston 95 to the valve stem so that the valve plug will turn together with the piston, and then automatically uncoupling the piston from the valve stem so that said piston can continue to rotate without further imparting rotation to the valve plug. It will be further noted that means are provided for moving the valve stem axially of the valve casing through means operated by the rotating piston in cooperation with non-rotating means operatively connected to said valve stem so as to effect the unseating and reseating of the valve plug during the periods the rotating piston is uncoupled from the valve stem.

It has been described that collar 81 on sleeve 181 is connected to cam plate 128, therefore, any rotary movement of cam plate 128 will cause a corresponding rotary movement being imparted to collar 81. Since collar 81 is formed with a cam surface 296, which cam surface is engaged by the stem 295 of the secondary pilot valve device 220, obviously said valve device will be actuated by movement of collar 81.

As shown in Figs. 4 and 11, when the valve is in closed position, valve stem 295 is in depression 297 of cam surface 296, so that the valve 291 is seated. When the collar 81 rotates as the result of the rotation of piston 95 heretofore described, valve stem 295 will move out of the depression 297 onto the higher part of cam surface 296, and this action unseats valve 291, so that fluid under pressure in piston chamber 252 is vented through passage 254, chambers 253, 299, and pipe 300 (see also Fig. 10). In this way there will be no fluid under pressure in chamber 252 during the entire rotary movement of piston 95.

After rotary piston 95 has completed its movement, valve stem 295 will drop into depression 298, thereby permitting the valve 291 to seat and cut off communication from the piston chamber 252 to the sewer pipe 257.

Since chamber 252 is connected to the source of supply of fluid under pressure in chamber 246, through pipes 250 and 251, when valve 291 is seated, fluid under pressure will build up in chamber 252, the rate at which the fluid builds up in said chamber being controlled by means of the throttling valve device 221 shown in Fig. 12.

Since the area of piston 244 is greater than the area of the top of the valve 218, when the fluid under pressure in chamber 252 has built up an amount sufficient to overcome the pressure in chamber 246 acting on the top of valve 218, said valve will be moved upwardly into engagement with seat 245, thereby cutting off the supply of fluid under pressure from the main pipe line 247 to the chambers of the rotary piston 95.

With the valve 218 thus closed, fluid under pressure will be bottled up in chamber 308, and also in piston chambers 102, 104, so that the rotary piston 95 will be retained in valve open position.

Since the lever 261 is connected to collar 81 through link 262 and crank arm 263, rotation of collar 81 in the manner heretofore described will shift the position of the lever 261 from that shown in Fig. 7 to that shown in Fig. 8. Since one arm of the bell crank lever 273 is connected to the lever 261, the bell crank lever 273 will also be actuated so that it is returned to the position shown in Fig. 4, thereby bringing the depressed portion 286 of cam surface 277 in alinement with the extremity of the valve stem 285 so that the valve 281 is seated. With the outlet from chamber 249 thus closed, fluid under pressure in chamber 252 will not be permitted to escape from chamber 252, since chambers 249 and 252 are connected through pipes 250 and 251, as has been heretofore described.

Referring now to Fig. 8, it will be noted that the right end of valve stem 227 abuts the enlarged portion 324 of rod 323.

Since valve devices of the type herein described when mounted in a water pipe line or other pipe lines carrying fluid are adapted to remain in open position for extremely long periods of time, it is possible that some of the parts of the operating mechanism may get corroded so that movement thereof in the desired manner may be prevented, or if not prevented, slightly retarded, thereby hindering the functioning of such operating elements.

Thus, if the valve 216 should become stuck within the chamber 215 when in the open position as shown in Fig. 8 and failed to move from such position to its other position when the control valve device is operated, by manipulating the hand wheel 325, the valve stem 227 can be forced towards the left as viewed in Fig. 8, thereby breaking the seal between the valve 216 and the wall of the chamber 215 and permitting free sliding movement of the valve in the casing.

Since the rod 323 has a head 324 on its extremity, after the valve stem 227 has thus been moved away, the hand wheel 325 can be turned back in the opposite direction, thereby backing the rod 323 away from the end of the valve stem 227, and such reverse movement of the rod will be arrested when the head portion 324 thereof abuts the inner end of the sleeve 320. Since the sleeve 320 is disposed in the desired adjusted position, it will be obvious that when the rod 323 is thus retracted in the sleeve the parts will again be in proper adjusted position.

When the valve plug 13 closes the reverse operation occurs.

First, the actuator (solenoid 331 or diaphragm 333) for the pilot valve 217 operates to shift the position of the pilot valve 217 from the position shown in Fig. 8 to the position shown in Fig. 7.

By this action, fluid under pressure which was supplied to piston chamber 235 is vented to the sewer pipe 257, through port 236, passage 241 and 242, and chamber 215, and fluid under pressure is supplied to piston chamber 237 from chamber 308, through pipe and passage 316, chamber 233, and port 238, so that piston 225 is moved toward the left (Figs. 6, 7 and 8) thereby shifting the valve 216 from the position shown in Fig. 8 to the position shown in Figs. 6 and 7.

When the valve 216 has thus been moved, port 307 will be connected to chamber 215 thereby permitting fluid under pressure in chambers 102 and 104 to pass to the sewer through passages 310, port 307, chamber 215 and pipe 257, and port 308 will be connected to port 309.

Simultaneous with the movement of pilot valve 217 from the position shown in Fig. 8 to the position shown in Fig. 7, bell crank lever 273 will also be operated in the manner heretofore described to unseat valve 281 of the primary pilot valve device 219, and permit fluid under pressure in piston chamber 252 (Fig. 10) to be relieved, so that valve 218 is unseated and fluid under pressure is supplied to chamber 308 from pipe 247.

Referring to Figs. 2, 6 and 7, with ports 308 and 309 connected in the manner above described, fluid under pressure will be supplied to chambers 103 and 105 of the rotary piston 95 from supply pipe 247, through chambers 246, 248, 308, port 309, passages 313, and ports 314.

With fluid under pressure thus supplied to piston chambers 103 and 105, piston 95 will be rotated in a clockwise direction (Fig. 2) so that arms 96 and 97 thereof are moved through an angle of approximately 120° back to the position shown in Fig. 2.

During the first 15° rotation of piston 95, the plug 13 will be unseated as the result of cam plate 127 sliding radially on the cam surfaces 161 of cam plate 129, to effect straight line axial movement of the cam plate 129, valve stem 57 and plug 13 in the manner heretofore described.

During the next 90° rotation of piston 95 the plug 13 will be turned from its open to its closed position, on account of the interlocking of cam plate 129 with cam plates 127, 128, resulting from pin 130 being disposed in notch 166 of cam plate 129.

When the plug 13 has been turned back 90°, lug 174 thereof will engage stop lug 175 (Fig. 1) so that further rotation of said plug is prevented, and simultaneously pin 130 will be disengaged from notch 166, thereby uncoupling cam plate 129 from cam plates 127, 128, so that during the final 15° rotation of piston 95, cam plates 127 and 128 will slide radially on the cam surfaces of plate 129, thereby forcing cam plate 129, valve stem 57 and plug 13 in a straight line axially to reseat said plug 13. At the end of the last 15° rotation of piston 95 the parts will be restored to their respective positions, as shown in Figs. 1 and 2.

Since collar 81 on sleeve 181 is connected to cam plate 128, the rotary movement of cam plate 128 above described causes a corresponding rotary movement being imparted to collar 81, and this action causes valve stem 295 of the secondary pilot valve device 220 to ride up out of depression 298 on to cam surface 296. This action unseats valve 291 so that fluid under pressure in piston chamber 252 is vented through passage 254, chambers 253, 299, and pipe 300 (see Figs. 4, 10 and 11). In this way there will be no fluid under pressure in chamber 252 during the entire rotary movement of piston 95.

After rotary piston 95 has completed its movement, valve stem 295 will drop into depression 297, thereby permitting valve 291 to seat and cut off communication from piston chamber 252 to the sewer pipe 257.

Since chamber 252 is connected to the source of supply of fluid under pressure in chamber 246, through pipes 250 and 251, when valve 291 is seated, fluid under pressure will build up in chamber 252 as has heretofore been described, and valve 218 will be moved upwardly into engagement with seat 245. In this way the supply of fluid under pressure from the main pipe line 247 to the chambers of the rotary piston 95 will be cut off.

With the valve 218 thus closed, fluid under pressure will be bottled up in chamber 308, and also in piston chambers 103 and 105, so that the rotary piston 95 will be retained in valve closed position.

Rotation of collar 81 in the manner described shifts the lever 261 from the position shown in Fig. 8 to that shown in Fig. 7. This action operates bell crank lever 273 so that primary pilot valve 219 is actuated to close chamber 249. With the outlet from chamber 249 thus closed, fluid under pressure in chamber 252 will not be permitted to escape from chamber 252 and consequently valve 218 will be retained seated against seat 245.

As shown in Figs. 14, 15, 16 and 17, pipes 339 and 340 may be operatively connected to the conduit in which the main valve is installed so that the fluid under pressure in the conduit can be utilized for operating the diaphragm device 332.

In the present instance one end of pipe 339 is shown terminating at a piezometer 346 on one side of the plug 13 (see Fig. 15).

On the other hand, pipe 340 leads to a chamber 347 of an ejector 348.

Projecting into chamber 347 is a tapered or conical tube 349, the outer end of which is connected to a pipe 350.

The other end of pipe 350 terminates as shown at 351, in the waterway 14 of the valve on the side of the plug 13 opposite to the side having the piezometer 346 (see Figs. 14 and 16).

Flow through the valve from a pump or blower is in the direction indicated by the arrow, Fig. 14, and pipe 350 has an opening 352 disposed so as to intercept the fluid flowing through the valve when a pump or blower is operating as is well known in the art.

Leading from chamber 347 of the ejector 348 and disposed axially with respect to tube 349, is a second tapered or conical tube 353, the outer end of which is connected to a pipe 354.

The other end of pipe 354 terminates, as shown at 355, in the waterway 14 of the main valve on the same side of the plug 13 as is the end 351 of pipe 350 heretofore referred to. However, opening 356 in the end of pipe 355 is disposed, as shown in Fig. 16, in the opposite direction or downstream with respect to the disposition of the opening 352. Pipes 350 and 354 constitute flow tubes.

Figure 17:
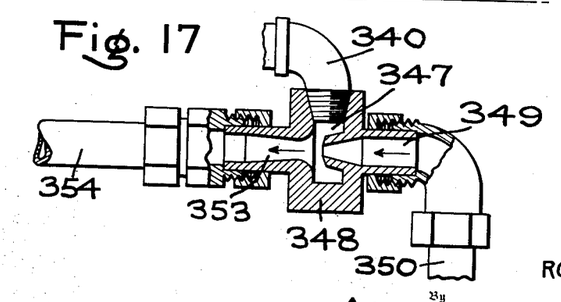
Fig. 17 is an enlarged section taken on the line 17—17 of Fig. 14.

As shown in Fig. 17, the smaller or inner end of tapered tube 353 of the ejector is flared outwardly and this inner end of tube 352 is disposed in suitable spaced relation with the inner or smaller end of the tube 349. Tube 349 projects into chamber 347 a suitable distance to provide a throat having a restricted area.

When the main valve is installed in a conduit leading from a pump or blower, the valve may function as a check valve so as to automatically cut off communication through the conduit when the pump or blower shuts down. In such installations the piezometer 346 is connected to the opening side of the diaphragm 333 (see also Fig. 8), and the closing side of said diaphragm is connected to the ejector device 348 by pipe 340, as has been described.

Assuming that the main valve is closed and the pump or blower is started up, pressure is developed on the pump side of the valve slightly in excess of the static pressure on the opposite side of the closed plug 13. This pump pressure is transmitted to the diaphragm chamber 337, through piezometer 346 and pipe 339, and diaphragm 333 moves to open position (see Fig. 8), since the fluid pressure thus built up in chamber 337 exceeds the combined pressure of fluid in diaphragm chamber 338, plus the pressure of spring 343.

Movement of the diaphragm 333 to open position effects opening of the main valve plug 13 through the action of control valve device 211, as has been heretofore described.

As soon as plug 13 starts to open, flow is created through the waterway 14 of the main valve, and therefore, a flow is also created through the flow pipes 350 and 354 and the ejector device 348.

Due to the fact that the throat area in the ejector 348 is smaller than the area of the flow pipes 350 and 354, the velocity through the throat of the ejector is in excess of the velocity in the flow tubes 350 and 354 and this excess velocity produces a static pressure at the throat which is lower than the pressure in the main valve waterway 14 or the flow tubes 350 and 354.

As heretofore mentioned, ejector chamber 347 is connected to the closing side of the diaphragm 333 (chamber 338), and therefore, the reduced static pressure at the throat of the ejector is transmitted to diaphragm chamber 338 through pipe 340, so that the pressure of fluid in chamber 338 remains lower than the pressure of fluid in chamber 337 and the diaphragm 333 is held seated against seat 342 as long as the valve plug 13 is open and there is flow through waterway 14 in the direction of the arrow, Fig. 14.

It should be noted that the tension of spring 342 is adjusted to exert a force slightly lower than the resultant force of the lower pressure on the area of the diaphragm 333, and the combined functions of the piezometer 346 and flow tubes 350 and 354, hereinabove described, result in maintaining the diaphragm in the open position shown in Fig. 8, and consequently the main valve plug 13 is in open position, until such time as velocity through the waterway 14 ceases and the ejector device 348 becomes ineffective, due to lack of velocity. For instance, when the pump or blower ceases to operate, and, therefore, flow through the conduit in which the main valve is installed ceases, since the flow of fluid through the ejector device 348 will also cease, the static pressure in chamber 347 will correspondingly increase and such increase in fluid pressure will be conducted to diaphragm chamber 338 so that the pressure on both sides of the diaphragm 333 becomes equal. The force of spring 343 acting on one side of the diaphragm 333 will then move the diaphragm to its closed position against seat 341 and this action results in the main valve plug 13 being moved to its closed position through the action of the control valve device 211, as has been heretofore described.

Having thus described my invention, what I claim is:

1. The combination with a valve body having a plug movable therein for controlling communication through the valve, said plug having an operating stem, mechanism for operating the plug including a fluid pressure operated piston operatively connected with said stem, a control valve device for controlling operating fluid to said piston, means for controlling the operation of said control valve device and including a pilot valve, means operatively connecting said plug stem with said control valve operating means, and an auxiliary pilot valve device for said control valve device operated by said connecting means.

2. The combination in a valve mechanism comprising a valve casing having a chamber, a movable valve element within said chamber for controlling fluid power from the chamber to a plurality of ports connected to said chamber, means for actuating said valve element in opposite directions including fluid pressure opening and closing chambers, a control valve for controlling fluid pressure in said opening and closing chambers, means for operating said control valve, a source of fluid power supply, a shut off valve for controlling the fluid power to said valve casing chamber, a primary pilot valve device for said shut off valve, a secondary pilot valve device for said shut off valve, and means operative by said control valve operating means for successively operating both of said pilot valve devices.

3. The combination in a valve mechanism comprising a valve casing having a chamber, a sleeve valve within the chamber for controlling fluid power from the chamber to a plurality of ports connected to the chamber, a source of fluid power supply, a fluid pressure actuated valve for controlling the fluid from said power supply to said chamber, means for operating said sleeve valve, a primary means for controlling the operation of said power supply control valve, a secondary means for controlling the operation of said power supply control valve, and means connecting said sleeve valve operating means with said primary control means and said secondary control means for successively operating the same.

4. The combination in a valve mechanism comprising a valve casing having a chamber, a movable valve element within said chamber for controlling fluid power from the chamber to a plurality of ports connected to said chamber, a source of fluid power supply, a shut off valve for controlling the fluid power to said chamber, a primary pilot valve device for said shut off valve, a secondary pilot valve device for said shut off valve, means for operating said movable valve element, and means operatively connecting said valve element operating means with said primary pilot valve device and with said secondary pilot valve device for successively actuating both of said pilot valve devices.

5. The combination in a valve mechanism comprising a valve casing having a chamber, a movable valve element within said chamber for controlling fluid power from the chamber to a plurality of ports connected to said chamber, a source of fluid power supply, means for controlling the fluid power supplied to said chamber, means for operating said movable valve element, and means operable by said valve element operating means for controlling the operation of said fluid power controlling means.

ROBERT BISCHOFF.